Jan. 30, 1968     S. D. BARNETT     3,366,161
MULTILOOP SCREEN SUSPENSION SYSTEM
Filed Sept. 24, 1965
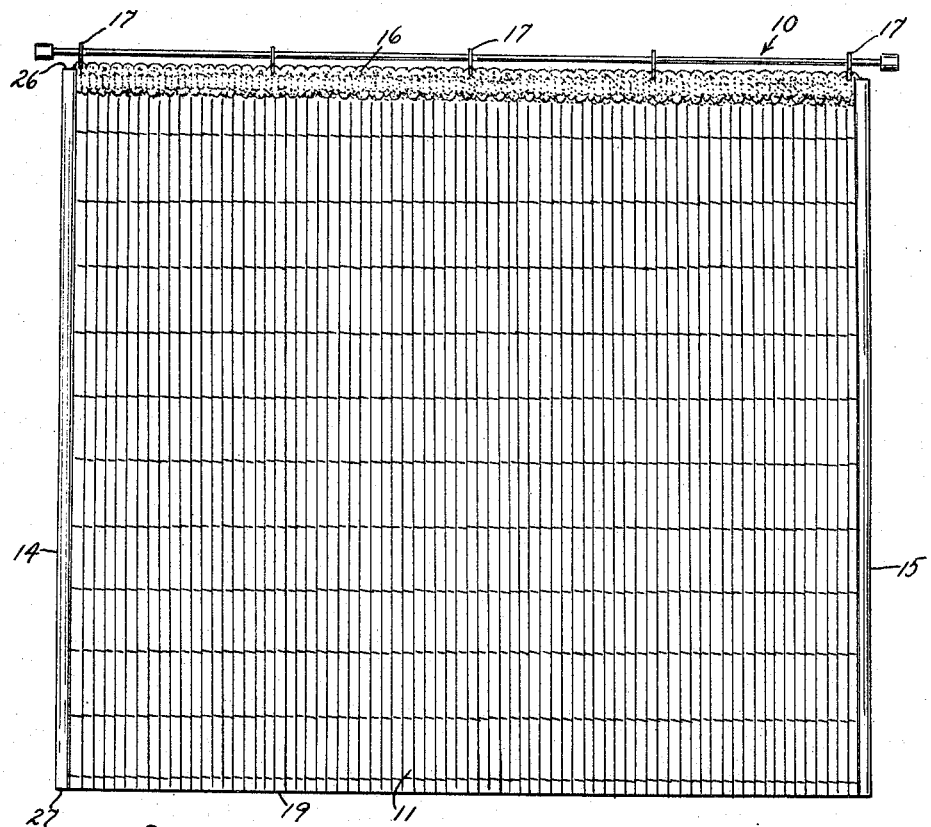
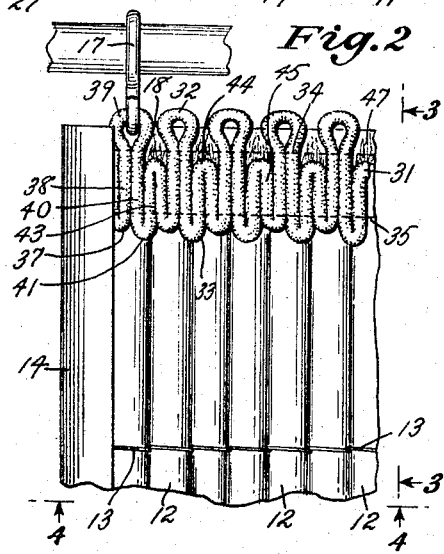
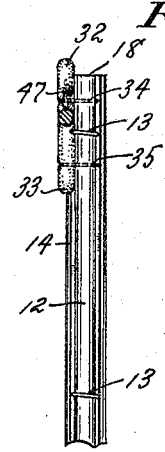
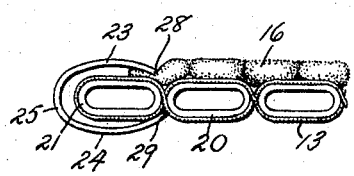

United States Patent Office 3,366,161
Patented Jan. 30, 1968

3,366,161
MULTILOOP SCREEN SUSPENSION SYSTEM
Stanley D. Barnett, Mount Vernon, N.Y.
(490 Nepperhan Ave., Yonkers, N.Y. 10701)
Filed Sept. 24, 1965, Ser. No. 489,815
2 Claims. (Cl. 160—368)

ABSTRACT OF THE DISCLOSURE

A slat-type screen suspension system including a single continuous strand forming a first plurality of upper loop-forming sections, and a plurality of lower spacing sections, each of the loop-forming sections including first and second elongated vertical rectilinear portions, and a curved loop interconnecting said portions at the upper ends thereof, said spacing sections including first and second vertically disposed elongated portions, interconnected by a bend portion at the upper ends thereof, said rectilinear portions and spacing sections all lying in mutually juxtaposed parallel contacting relation to provide a large number of means for interconnecting hanging or suspension means, and simultaneously providing a decorative appearance.

This invention relates generally to the curtain and drape art, and more particularly to an improved suspension system for use in supporting plastic slat-type blinds or curtains, which are flexible, in a vertical plane, so as to permit the same to be drawn to the side of a window or other opening.

In relatively low cost constructions, it has been found desirable to use extruded plastic tubing which can be interconnected by looped threads to form a flexible panel which serves as a screen. Because of lack of mechanical strength, it is not feasible to directly fasten hooks to the individual plastic tubes or slats.

It is therefore among the principal objects of the present invention to provide an improved suspension system which may be conveniently interconnected to the ends of the plastic tubes or slats whereby the same may be supported in adjustable relation with respect to a window or other opening.

Another object of the invention lies in the provision of an improved suspension system in which the point of attachment may be varied over minute increments along the upper edge of the screen.

Yet another object of the invention lies in the provision of an improved screen suspension system including a plurality of fabric loops which are interconnected to the synthetic resinous screen element, the loops being engaged by hook elements carried by a conventional supporting bar or other supporting structure.

A feature of the disclosed embodiment lies in the unusually attractive appearance of the structure forming the suspension system.

Another feature of the disclosed embodiment lies in the use of threaded means for interconnecting the suspension element to the screen.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a view in elevation of an embodiment of the invention.

FIGURE 2 is a fragmentary view in elevation corresponding to the upper left-hand portion of FIGURE 1.

FIGURE 3 is a fragmentary view in elevation as seen from the plane 3—3 in FIGURE 2.

FIGURE 4 is a fragmentary bottom plan view as seen from the lower portion of FIGURE 3.

FIGURE 5 is a fragmentary enlarged bottom plan view corresponding to the left-hand portion of FIGURE 4.

FIGURE 6 is a view in elevation showing one of the hook elements forming a part of the suspension system.

In accordance with the invention, the device, generally indicated by reference character 10, comprises broadly: a synthetic resinous screen 11 formed by a plurality of hollow plastic tubes or slats 12 interconnected by thread means 13 in well-known manner. The screen 11 is bordered at the vertical edges thereof by elongated end cap members 14 and 15, and along the upper horizontal edge by a textile suspension element 16 more fully described hereinbelow. The suspension element 16 is engaged by a plurality of hook elements 17 at desired locations.

The plastic tubes or slats 12 are generally similar, each including upper and lower ends 18 and 19, respectively, flat side wall members 20 and curved end wall members 21. As mentioned hereinabove, they are most conveniently formed as severed lengths of a continuous synthetic resinous extrusion by means well-known in the art.

The elongated end cap members 14 and 15 are similar, each including a pair of side walls 23 and 24 interconnected by an end wall 25. Each includes upper and lower ends 26 and 27, respectively, defining a length substantially equal to that of the slats 12. Longitudinal edges 28 and 29 define an interstice to permit the same to be engaged upon the outermost of the slats 12 to form a finished edge.

The textile suspension element 16 is preferably of braided strand-like construction, and includes a plurality of upper loop-forming sections 32 interconnected by lower spacing sections 33. The element 16 is interconnected at points adjacent to the upper edge of the screen 11 by stitch means 34 and 35 which extend through the slats 12.

The upper loop-forming sections 32 are all similar, each including a lower bend portion 37, a first vertical rectilinear portion 38, an upper loop portion 39, and a second vertical rectilinear portion 40 which interconnects with an adjacent lower bend portion 41. The lower spacing sections 33 are also similar, each including a first vertical rectilinear portion 43, an upper bend portion 44 and a second vertical rectilinear portion 45. In the area indicated by reference character 47, a portion of the threads comprising the strand 31 are pulled upwardly to fill the space beneath adjacent upper loop portions 39, and add a more attractive appearance.

The hook elements 17 are generally similar, and preferably made as injection-molded pieces, each including a continuous ring 50 engageable with a curtain rod or other support 50a and an open hook 51 engageable within any of the upper loop portions 39. In suspending the screen 11, the hook element 17 may be located as desired, it being unnecessary to engage each of upper loop portions 39.

I wish it to be understood that I do not consider the invention limited to the precise details of structure shown and set forth in this specification, for obvious modifications will occur to those skilled in the art to which the invention pertains.

I claim:

1. In a slat-type screen suspension system, a flexible suspension element including a continuous strand forming a plurality of upper loop-forming sections, and a plurality of lower spacing sections; each of said loop-forming sections including first and second elongated vertical rectilinear portions, and a curved loop interconnecting said portions at the upper ends thereof; said spacing sections including first and second vertically disposed elongated portions interconnected by a bend portion at the upper ends thereof; said first and second rectilinear portions and said spacing portions being in parallel juxtaposed mutually contacting relation.

2. Structure in accordance with claim 1, including a plurality of hook elements selectively engageable with the loops of said loop-forming sections.

References Cited

UNITED STATES PATENTS

| | | | |
|---|---|---|---|
| 1,892,448 | 12/1932 | Chapman | 160—388 |
| 2,244,300 | 6/1941 | Kwon | 160—330 |
| 2,301,161 | 11/1942 | Gaines | 160—388 |
| 2,444,166 | 6/1948 | Lesaroy | 160—330 |
| 2,596,395 | 5/1952 | Fitz Gibbon | 160—330 |
| 3,226,285 | 12/1965 | Iorenko | 160—332 |

FOREIGN PATENTS

| | | |
|---|---|---|
| 1,223,955 | 6/1960 | France. |
| 101,277 | 1/1899 | Germany. |
| 1,038,730 | 9/1958 | Germany. |

DAVID J. WILLIAMOWSKY, *Primary Examiner.*

PHILIP C. KANNAN, *Assistant Examiner.*